United States Patent [19]  
Hazenbroek et al.

[11] Patent Number: 4,559,672  
[45] Date of Patent: Dec. 24, 1985

[54] POULTRY CUT-UP MACHINE

[76] Inventors: Jacobus E. Hazenbroek, Burg de. Zeeuwstraat 52, Numansdorp, Netherlands; William L. Wallbridge, Romsey, Hants, England

[21] Appl. No.: 607,417

[22] Filed: May 7, 1984

Related U.S. Application Data

[63] Continuation-in-part of Ser. No. 529,153, Sep. 2, 1983.

[51] Int. Cl.[4] .............................................. A22C 21/06
[52] U.S. Cl. ......................................................... 17/11
[58] Field of Search ..................................... 17/11, 52

[56] References Cited

U.S. PATENT DOCUMENTS

| 3,531,825 | 10/1970 | Segur et al. | 17/11 |
| 3,624,863 | 5/1970 | Gasbarro | 17/11 |
| 4,067,085 | 1/1978 | Gasbarro | 17/11 |
| 4,251,901 | 2/1981 | Thomas et al. | 17/52 |
| 4,406,037 | 9/1983 | Hazenbroek | 17/11 |
| 4,505,002 | 3/1985 | Tielman | 17/11 |

Primary Examiner—Willie G. Abercrombie  
Attorney, Agent, or Firm—Thomas & Kennedy

[57] ABSTRACT

A worker hangs birds on a series of movable modules M by placing the hocks of previously slaughtered and eviscerated birds in the pair of forks 30 affixed to the support plate 29 of each module. The thighs are received in the pair of tiltable forks 31. As the modules are conveyed about the machine a mandrel 28/70 carried by each module moves down into the cavity of the bird to stabilize the bird, and the bird is moved with the module through several cutting discs 1–7 which cut the carcasses into sections. The modules are rotated to orient the bird with respect to the cutting discs, and the legs of the bird are stretched by the tiltable forks 31 as the leg joint is cut. The mandrel 28/70 has a slot 77 through which a blade 5 passes in bisecting the backbone and the breast with the bird backbone lodged in the slot.

1 Claim, 14 Drawing Figures

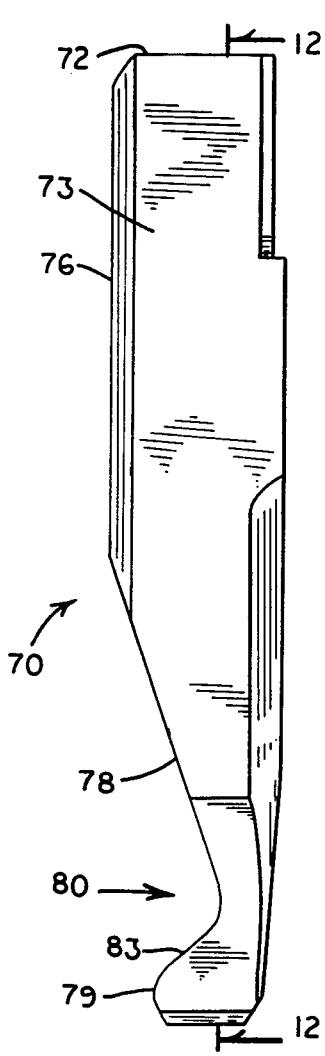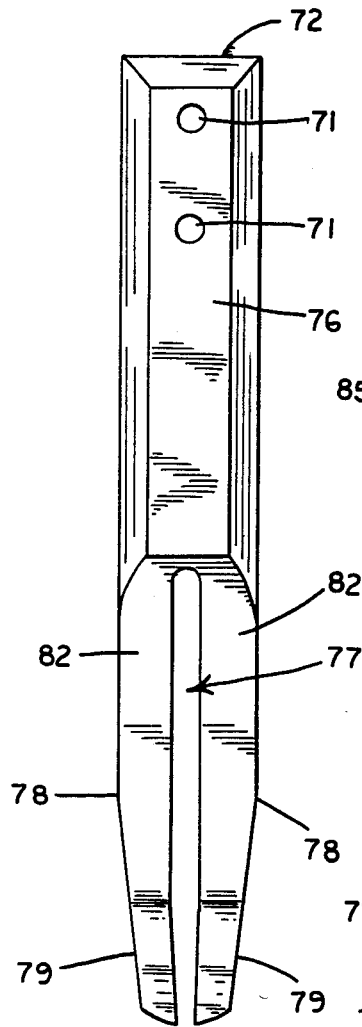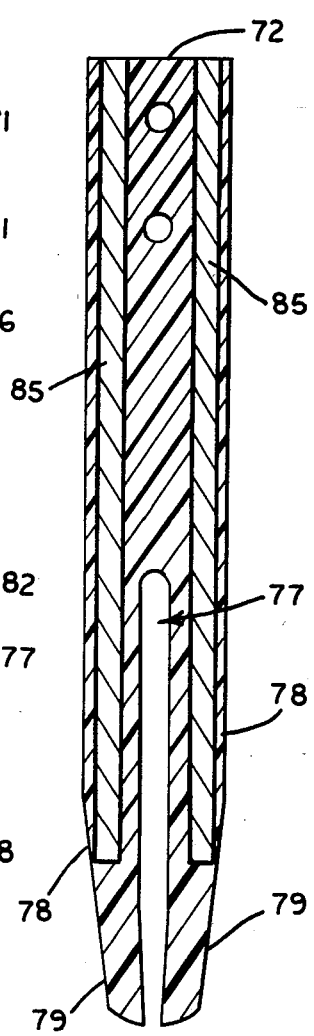
FIG 10    FIG 11    FIG 12
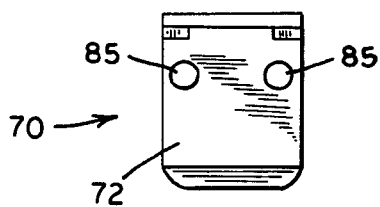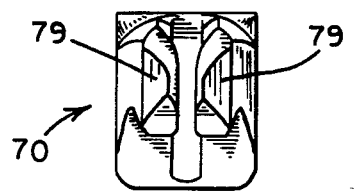
FIG 13    FIG 14

POULTRY CUT-UP MACHINE

REFERENCE TO RELATED APPLICATION

This is a continuation-in-part of U.S. patent application Ser. No. 529,153 filed Sept. 2, 1983, which application claims priority to Netherlands application No. 83.01800, filed in The Netherlands on May 20, 1983.

BACKGROUND OF THE INVENTION

This invention concerns an improved poultry cut-up method and apparatus, in which a previously slaughtered and eviscerated, oven-ready poultry carcass is cut in sections.

In the past, poultry carcasses have been removed from the overhead conveyor line in a processing plant and moved through various cutting equipment to separate the legs, thighs, and wings from the carcass, and to divide the main portion of the carcass into sections. For example, U.S. Pat. No. 3,943,600 describes a system for cutting apart poultry carcasses with the whole carcass entering a machine and the carcass being divided as it moves through the machine. Also, U.S. Pat. No. 3,624,863 describes a cut up machine in which poultry carcasses are mounted on mandrels and advanced through a series of cutting stations. U.S. Pat. Nos. 4,016,624, 3,930,282, 4,251,901, 4,306,335, and 4,385,421 describe other examples of how poultry carcasses can be cut apart.

While the prior art poultry cut-up machines have been successful to a limited extent, the most popular cut-up machines do not handle an entire carcass because the carcasses are not all the same in size and proportion and these variations tend to cause the machines for cutting the entire carcass to improperly cut the carcass. Rather, the most widely used cut-up machines receive one half of a previously cut carcass, either the saddle or the breast. For example, U.S. Pat. No. 4,385,421 describes a cut-up machine that receives the saddle of a bird and removes the legs at their thigh joints from the back of the carcass. Likewise, my copending U.S. Application filed July 12, 1983 describes a halving machine which cuts through the carcass between the breast and the saddle and through the back bone to divide the carcass in half so that each half can be processed separately.

Although the separate handling of the saddles and breasts of poultry carcasses tends to enable more accurate division of the carcasses to be made, the separate processing requires more manual handling of the carcasses and more pieces of equipment in the processing plant.

SUMMARY OF THE INVENTION

Briefly described, the present invention comprises a poultry cut-up machine which receives the whole dressed, oven-ready poultry carcass and accurately cuts the carcass into parts without manually handling the carcass at any stage of the cutting process. A sprocket wheel conveyor system is mounted on a support frame and moves a series of bird transport modules along a path adjacent a plurality of rotating cutting blades of a breast cutter, a wing cutter, a longitudinal cutter, a cross-bisection means and a drum-stick cutter. Each module includes a mandrel that is thrust into the previously eviscerated cavity to accurately position and to stabilize the bird. The conveyor system includes means to adjust the position of the mandrel and the bird as they move between the cutting stations, to put the mandrel and the bird in the correct position. When the mandrel is thrust into the cavity of a bird the mandrel tends to fill the otherwise empty cavity and to distend the surrounding portions of the carcass to their normal positions and to support the bird from inside its carcass with respect to the rotating blades, and to put the bird under tension.

Each of said modules comprises a support plate spaced laterally from a mandrel with at least one pair of forks mounted on the support plate and straddling the mandrel for suspending a chicken by its legs upside-down. The module is arranged to rotate about a vertical axis as it is moved by the conveyor which presents the bird at different orientations to the cutters.

The birds which are to be processed might have become distorted because of previous handling, as by the weight of other birds resting on a bird in a refrigerated area. The mandrel functions as a stretching cone to fill the cavity of the bird and to distend the carcass back to a more normal shape and the mandrel stabilizes the bird and causes the bird to be put under tension from inside. This is important especially with respect to the longitudinal cutter which makes a difficult cut directly through the breast and the backbone.

On the support plate of each transport module a fixed pair of upper forks are provided in which the legs of a bird can be hooked, and therebelow a tiltable pair of supporting forks are provided, which, after the birds have passed the longitudinal cutter, put the legs of the bird under tension from the knee-joint up to the thigh as the leg joint is separated.

Each mandrel preferably has adjacent its distal end a recess to give passage to the blades of the breast cutter, and each mandrel has a centrally positioned slot to give passage to the blade of the longitudinal cutter. Each mandrel slot extends between two slot entries with one slot entry being chamfered so as to have two facing grooves that together form an elongated furrow straddling the slot into which a bird backbone can be loaded. The mandrel carries its bird through the series of cutters, including a vertically oriented cutter which passes through the slots of the mandrel and supporting plate. The cutter passes first through the backbone, then through the mandrel, and finally through the breast. The force applied by the cutter to the backbone tends to seat the backbone more firmly in the slot of the mandrel, thus assuring an accurate cut through the backbone.

Thus, it is an object of this invention to provide an automatic poultry cut-up system in which whole, previously eviscerated poultry carcasses can be cut apart into a multiple number of segments that are ready for delivery to the supermarket and to food serving establishments without requiring further cutting steps.

Another object of this invention is to provide an automatic poultry cut-up machine which receives a whole dressed poultry carcass and accurately and rapidly divides the carcass into pieces suitable for delivery to the market place.

Another object of this invention is to provide an improved mandrel for insertion into the previously eviscerated cavity of a poultry carcass which tends to fill out the carcass and to hold the carcass in predetermined positions as the carcass is turned with he mandrel to various attitudes as the carcass is cut into pieces.

Other objects, features and advantages of the invention will become apparent from reading the following specification, when taken in conjunction with the accompanying drawings.

BRIEF DESCRIPTION OF THE DRAWING

The invention will be further elucidated herebelow from the drawing, in which by way of example an embodiment of a machine according to the present invention is represented.

FIG. 10 is a side elevational view of the mandrel illustrated in FIG. 8.

FIG. 11 is a rear elevational view of the mandrel shown in FIG. 8.

FIG. 12 is a cross-sectional view of the mandrel shown in FIG. 10 taken along plane 12—12 of FIG. 10.

FIG. 13 is a plan view of the mandrel shown in FIG. 8.

FIG. 14 is a bottom view of the mandrel shown in FIG. 8.

DETAILED DESCRIPTION

Figures 1, 2:
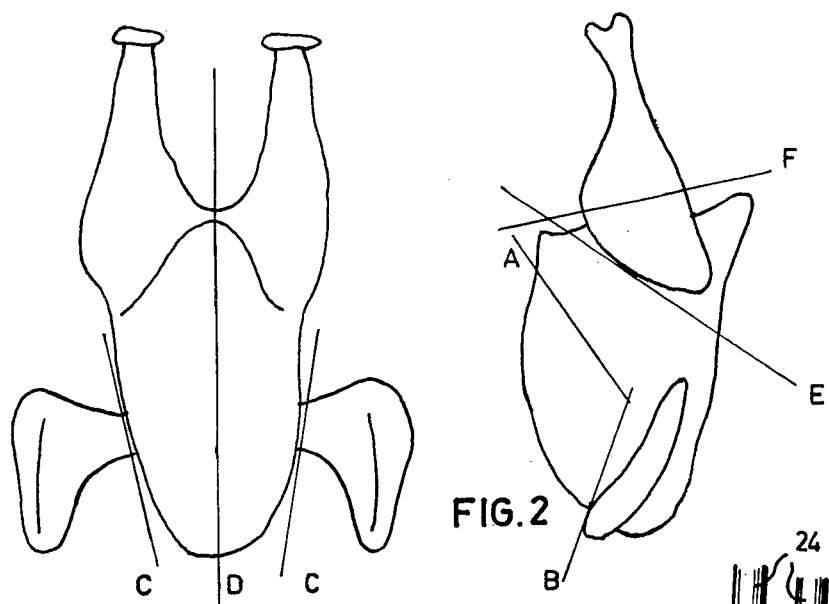
FIGS. 1 and 2 are schematic side elevational views of a bird, with cutting lines illustrating the cuts to be made by the cut up machine.

Referring now in more detail to the drawing, in which like numerals refer to like parts throughout the several views, the mounting of the birds to the machine takes place by hand on the non-visible side of the machine.

Figure 4:
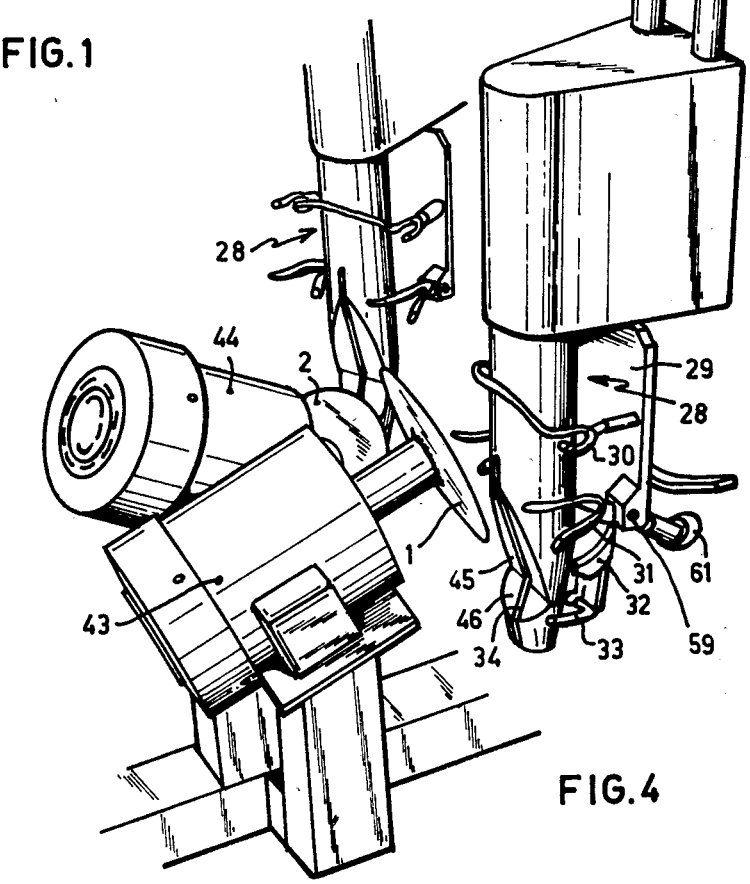
FIG. 4 is a detail illustration of the machine at the breast cutter.

Lines A and B of FIG. 2 indicate, with respect to the bird, the relative positions of the rotating blades 1 and 2 of the breast cutter illustrated in FIG. 4. Therefore, the breast pieces can be collected at B in FIG. 3.

Figure 5:
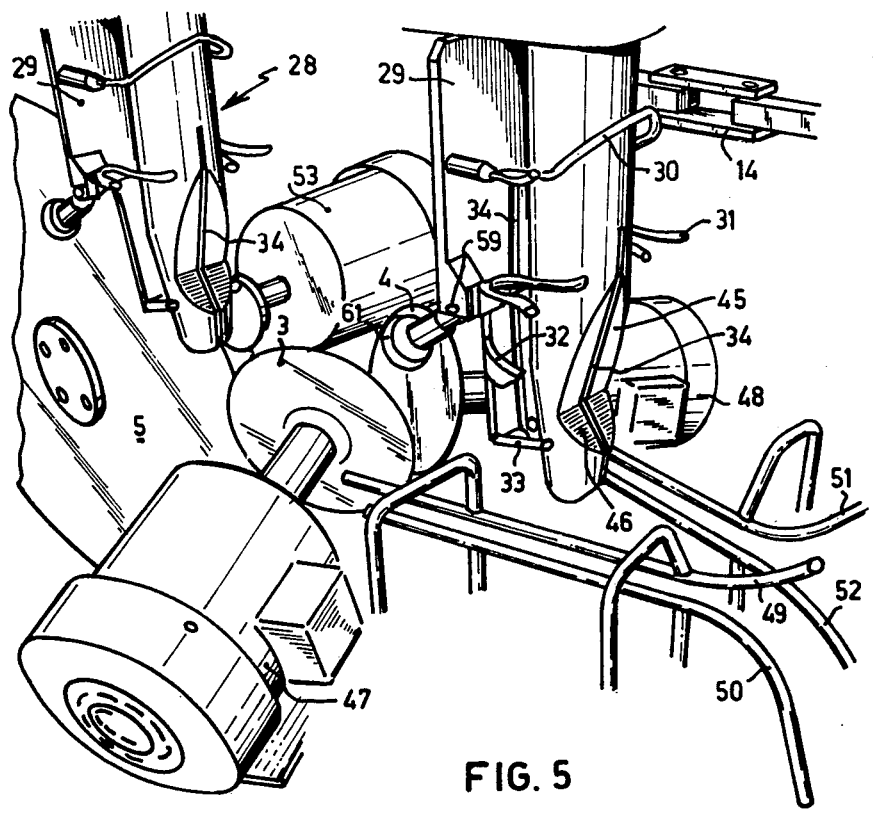
FIG. 5 is a detail illustration of the machine at the wing cutter and the longitudinal cutter.

Both of the lines C and the single line D of FIG. 1 indicate, with respect to the bird, the relative positions of the rotating blades 3, 4 and 5 of the wing cutter and longitudinal cutter, both illustrated in FIG. 5. The wings can be collected at C in FIG. 3. Since FIG. 1 is the breast view of the bird it will be clear that the bird should be rotated 90° between positions B and C of FIG. 3.

Figure 6:
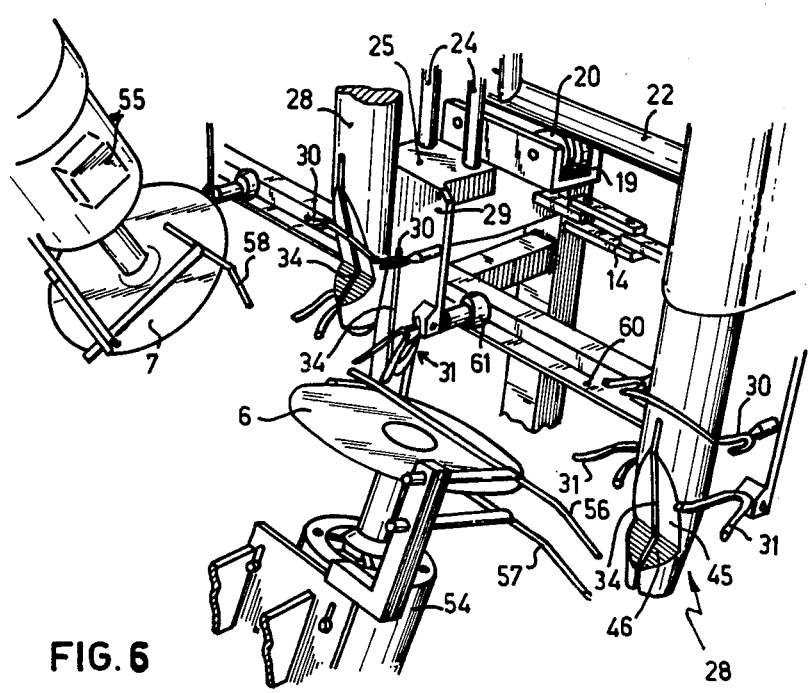
FIG. 6 is a detail illustration of the machine at the cross-bisection means and the drum-stick cutter.

Lines E and F of FIG. 2 indicate, with respect to the bird, the relative positions of the rotating blades 6 and 7 of the cross-bisection means and the drum-stick cutter, both illustrated in FIG. 6. At E in FIG. 3 the backs can be collected and at F the thighs. In the machine only the so-called drum-sticks are left then. Since the cuttings E and F are shown in FIG. 2, it will be clear that the birds will be rotated back again 90° between positions D and E in FIG. 3.

Figure 3:
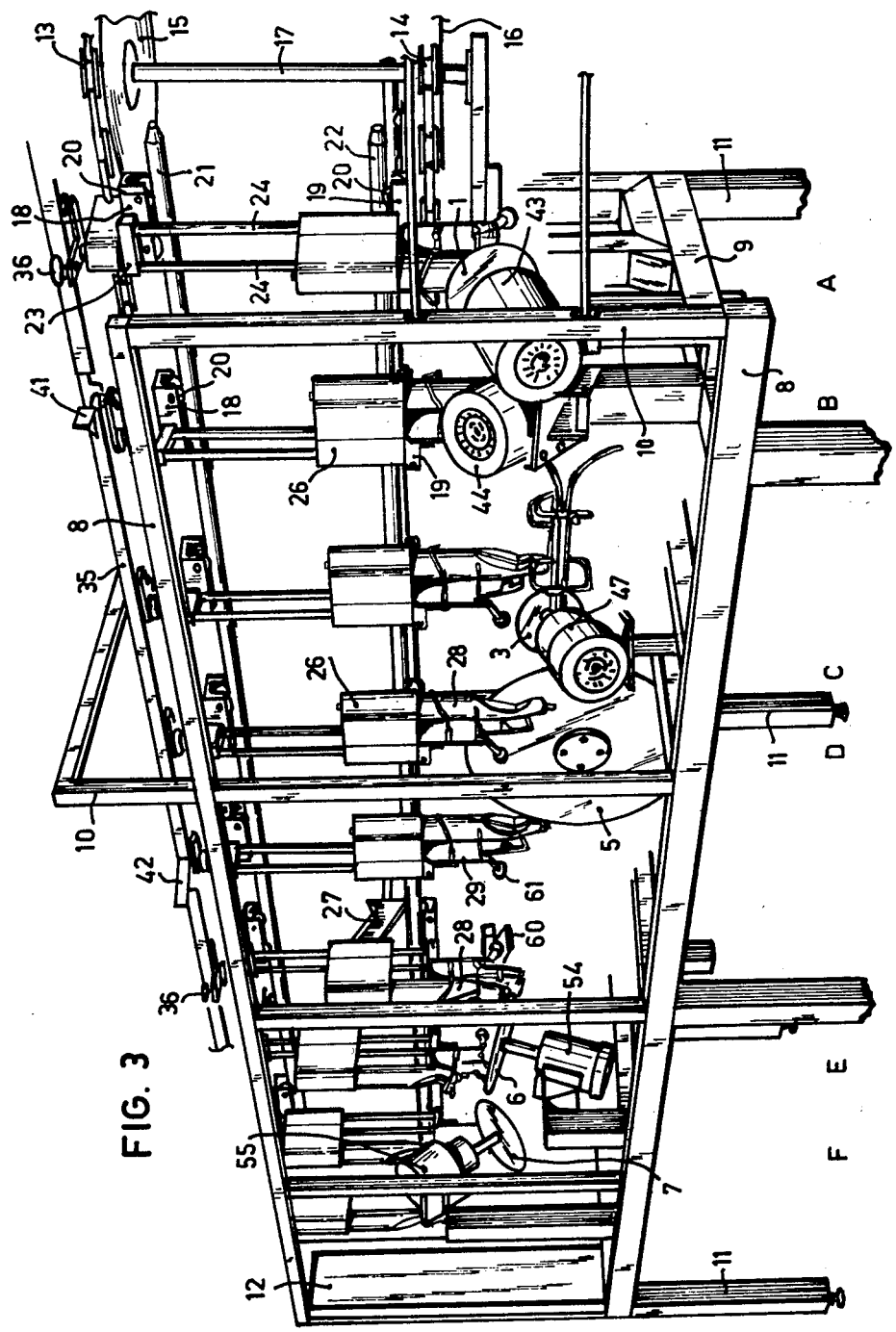
FIG. 3 is a perspective view of an embodiment of the cut up machine with movement of birds therethrough being from right to left.

The cut-up machine represented in FIG. 3 comprises a frame provided with longitudinal beams 8, crossbeams 9 and uprights 10. The represented frame has six legs 11, but of course it can be mounted in a elevated way with respect to the floor otherwise. A surface belt conveyor (not illustrated) usually is positioned beneath the lower longitudinal beams 8 to collect the segments of the birds dropped from the cut up machine. At least the side of the machine which is visible in FIG. 3 is completely covered by doors (not illustrated) during operation of the machine, and a security system (not shown) is provided which makes the rotating blades stop as soon as one of said doors is opened. In order to be able to illustrate the interior of the machine only one door 12 is provided on the remote end of the machine.

As illustrated in FIG. 3, a sprocket wheel system comprises an upper chain 13 and a lower chain 14. On the end of the machine which is nearby in FIG. 3, the chains 13 and 14 engage with chain wheels 15 and 16 supported on a vertical sprocket wheel shaft 17. The end of the machine which is remote in FIG. 3 has been carried out in an identical but not visible way. One of the sprocket wheel shafts is provided with a drive means for driving the sprocket wheel system.

A plurality of bird support modules M are positioned in series about the machine, and each module includes upper carriages 18 and 19 connected to upper chain 13. The upper carriages 18 are provided with wheels 20 at the lower side and similar lower carriages 19 (FIG. 6) are provided with wheels 20 at the upper side. At least at the places about the machine where the birds are cut the wheels 20 run over upper and lower guide rails 21 and 22, respectively. From FIG. 6 it appears that the guide rail 22 may be a tube having an annular cross-section; in that case the wheels are provided with two flanges.

Each of the carriages 18 supports an upper coupling member 23 which is rotatable about a vertical shaft 39 (FIG. 7), to which coupling member two vertical guide bars 24 are suspended. The lower ends of the guide bars 24 are, as shown in FIG. 6, connected to a lower coupling member 25 which is connected rotatably about a vertical shaft (not illustrated) with the carriage 29.

A block 26 is slidably mounted along guide bars 24 of each module M. The blocks 26 normally are supported by the coupling members 25, by each block resting on the upper surface of its coupling member, and the upward movement of each block by cam track 27 is guided through a curved path starting between the longitudinal cutter D and the cross-bisection means E in FIG. 3. A cam wheel is rotatably mounted to the rear surface of each block 26 and rides in the cam track 27. The downward movement of the blocks 26 is obtained on the not visible rear side of the machine by lowering the curved path again precisely before the end of the machine which is nearby in FIG. 3.

On each block 26 a specially designed stretching cone or mandrel 28 is suspended which, during the passage of the birds through the breast cutters A and B, the wing cutters C and the longitudinal cutter D, is placed in its bird, which positions and stabilizes the bird, fills the cavity of the bird and keeps the bird under tension from the inside.

By each lower coupling member 25 a supporting plate 29 (FIG. 6) is suspended, which is laterally spaced behind the mandrel 28. As illustrated in FIGS. 4–6, from said supporting plate 29 on both sides of the mandrel 28 extend a fixed pair of upper forks 30, a tiltable pair of supporting forks 31 positioned therebelow, a pair of bows 32 and a pair of arms 33. The members 30-33 provide together somewhat cup-like support from support plate 29, so that the bird is retained in the ideal position during the cutting operation.

The tiltable pair of supporting forks 31 are tilted by gravity to an up position when the birds are supplied to the side of the machine which is not visible in FIG. 3. After the birds have passed the longitudinal cutter D, the positioning by the mandrel 28 is no longer sufficient. The tiltable pair of supporting forks 31 are tilted "downwardly" then in a way which will be illustrated later on, in order to put the legs under tension from the knee-joint up to the thigh. This downward tilting of the forks 31 moves the forks out of the path of the drumstick cutter F.

From FIGS. 5 and 6 it appears that both the mandrel 28 and the support plate 29 have aligned slots 34. Said slots 34 serve to give passage to the large rotating blade 5 of the longitudinal cutter D through both the support plate and the mandrel.

Figure 7:
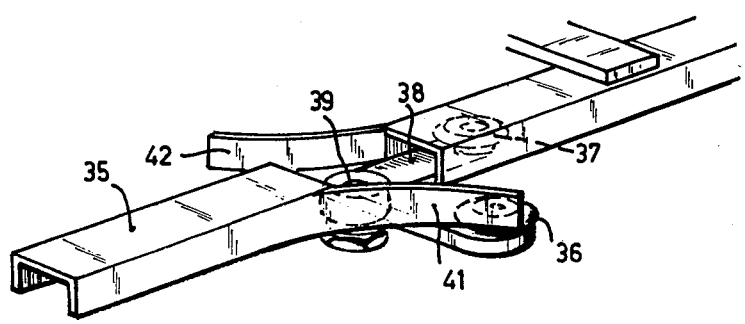
FIG. 7 is a detail illustration of the inverted channel with outwardly bent leg portions for positioning the modules.
Figure 8:
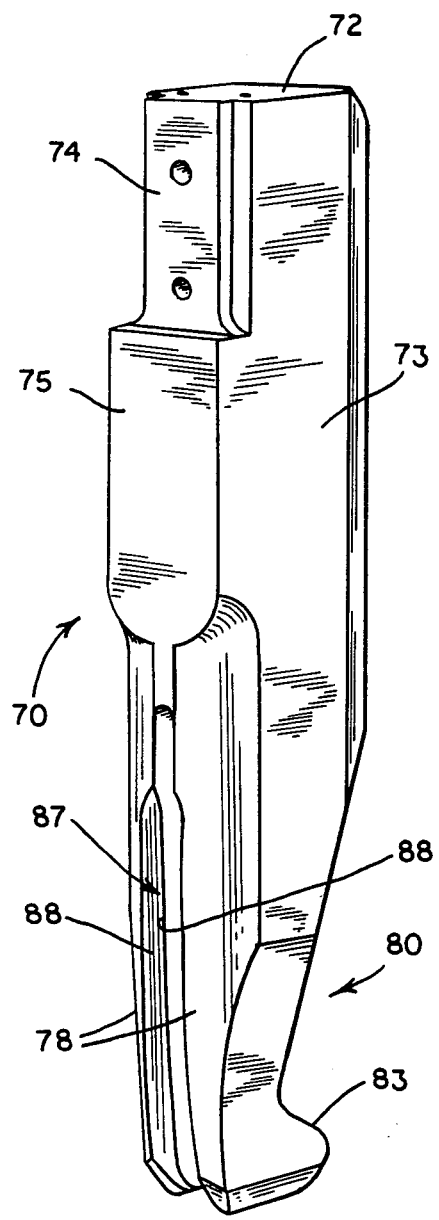
FIG. 8 is a perspective view of a mandrel embodying principles of the invention.
Figure 9:
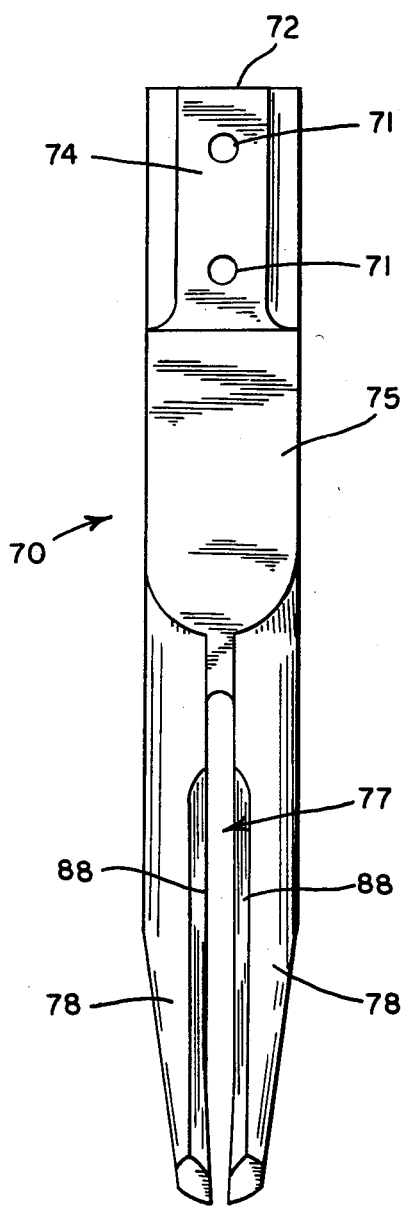
FIG. 9 is a front elevational view of the mandrel illustrated in FIG. 8.

In the total view of FIG. 3 finally reference should be made to an inverted channel 35 positioned above the upper chain 13, a special part of which is represented in FIG. 7. Said inverted channel 35 alternatingly houses the wheels 36 and 37 which are provided on the ends of a hooked horizontal lever 38 which is fastened to the vertical shaft 39 which on the other hand is fixedly connected to the upper coupling member 23 (FIG. 3) of each carriage 18.

On two places the side walls of the inverted channel are bent outwardly, viz., on the one hand between the breast cutters A and B and the wing cutter C, and on the other hand between the longitudinal cutter D and the cross-bisection means E. In FIG. 7 the first mentioned place is shown. The wheel 36 there runs against an outwardly bent side wall 41 of the inverted channel, whereby the vertical shaft 39 is rotated 90°. The wheel 37, which was in the channel, wants to turn to the ouside now and is enabled thereto in that in the opposite side wall of the inverted channel 35 also a part 42 is bent outwardly. The wheel 37 assures in the secondly meant place that the vertical shaft 39 is rotated back again 90°.

FIG. 4 shows details of the breast cutters A and B. The rotating blades 1 and 2 are driven by electromotors 43 and 44 respectively but other drive means are within the scope of the invention. The mandrels or stretching cones 28 have a recess which is limited by a surface 45 parallel to the surface of the blade 1, and surface 46 parallel to the surface of the blade 2. In FIG. 4 it can be seen that the stretching cones after passing the breast cutters A and B begin to rotate 90°.

FIG. 5 shows details of the wing cutters C and the longitudinal cutter D. The rotating blades 3 and 4 of the wing cutters C are driven by electromotors 47 and 48, respectively. Before the chickens arrive at the rotating blades 3 and 4, the wings are lifted between left and right hand pairs of wing guide straps 49,50 and 51,52 respectively. The rotating blade 5 of the longitudinal cutter D is driven by an electromotor 53. Also here other drive means are within the scope of the invention.

FIG. 6 shows details of the cross-bisection means E and the drum-stick cutter F. The rotating blades 6 and 7 are driven by electromotors 54 and 55, respectively. In FIG. 6 it can be seen from the position of the slot 34 of the stretching cone 28, that it has been rotated back again over 90° with respect to the position of FIG. 5.

In front of the rotating blade 6 of the cross-bisection means E a pair of guide straps 56,57 is provided, and in front of the rotating blade 7 of the drum-stick cutter F another single guide strap 58. The supporting forks 31 are enabled to tilt about a shaft 59 which is connected to the supporting plate 29. The tilting is controlled by a rising curve 60 which pushes a roller 61, which is connected with the forks behind the supporting plate 29, upwardly whereby the supporting forks will tilt "downward" and put the chicken legs under tension from the knee-joint up to the thigh. The backward or "upward" tilting and remaining in said position of the supporting forks 31 occurs under influence of gravitation. Therefore the mass behind shaft 59 is larger than in front of shaft 59.

After all above-mentioned operations have been carried out on the chickens, only the drum-sticks, which are suspended in the fixed pair of upper forks 30, are left. Said drum-sticks can be removed in a simple (not indicated) way.

With reference next to FIGS. 8–14 another mandrel or stretching cone 70 is shown which may be substituted for the previously described mandrel 28. The mandrel has an elongated body, preferably formed of fiberglass or a hard plastic, which is mounted with bolts passed through two mounting holes 71 to block 26 adjacent the plate 29. The mandrel has a flat top 72, flat side surfaces 73, flat front surfaces 74 and 75 and a flat rear surface 76. A lower portion of the mandrel is bifurcated by an elongated slot 77 to receive blade 5 therethrough. The slot extends through the mandrel body from front to rear whereby the lower portion of the mandrel is formed with two legs 78 that terminate with two feet 79. The mandrel has a recess indicated generally at 80 formed by two flat, canted rear wall sections 82 and by arches 83 of feet 79. Again, the recess is provided to accommodate in close proximity thereto the breast-cutting blades 1 and 2. A pair of steel strengthening rods 85 is embedded in the body of the mandrel so as to extend from the top 72 down into the two legs 79 to maintain proper leg separation.

With continued reference to FIGS. 8–14 the mandrel slot 77 is further seen to have a slot entry indicated generally at 87 provided by facing chamfers 88. These chamfers are formed on one surface of the mandrel, on each leg 78 and together form an elongated furrow or groove that straddles the slot 77 and which may be considered as a portion of the slot itself. The width of the furrow is such as to snuggly receive and hold or lodge a bird backbone. In one preferred case the furrow measures approximately 5/16 of an inch at its bottom where it merges in the slot proper, which itself measures 5/16 of an inch, to approximately 13/16 of an inch at its widest point or shoulders.

In mounting a bird to the mandrel the bird cavity is passed over the mandrel. As the cavity is thereby filled with the mandrel the bird muscles and membrane are stretched and the backbone is centered in the furrow as it contacts it. In this manner both the backbone and keel bone become properly aligned for exact cutting.

It thus is seen that a poultry cut-up machine is provided with a mandrel of improved construction.

It has been found that such a furrow holds the backbone of birds of a wide variety of sizes snuggly in place for bisectional cutting. In this manner the birds are inhibited from rotating on the mandrel, which rotation could cause the bisectional cut to pass to one side rather than through the backbone. The furrow and backbone lodged in the furrow should be presented to blade 5 as the leading side of the mandrel so that the cut by the blade is made from the outside toward the inside of the carcass and the back is cut before the breast. This tends to urge the backbone of the bird to become more firmly seated in the slot of the mandrel as the blade cuts into the backbone. This relationship tends to assure an accurate cut through the backbone. Moreover, the breast is cut from the inside out, that is from within the cavity of the bird, through the breast to the outside of the bird. This direction of cutting through the breast avoids having to make the more difficult cut from outside the bird into the relatively narrow breast bone, thereby avoiding the increased tendency of making an inaccurate cut through the breast.

It should be understood that embodiments other than that shown in the drawing are within the scope of the invention as set forth in the following claims.

We claim:

1. In a poultry processing machine for cutting apart a previously eviscerated bird, the improvement therein comprising a mandrel for insertion into the previously eviscerated abdominal cavity of a bird, said mandrel comprising a body of elongated, generally rounded exterior shape and including a mounting end at one end portion for attaching the mandrel body to a support member, a slot formed centrally through the distal end portion of said body which is opposite to said mounting end, said slot extending along the length of said body and dividing the distal end portion of said body into a pair of similar mandrel elements separated by the slot, said mandrel elements together defining a recess extending across said slot that intersects one side of said slot, whereby the pair of mandrel elements are inserted into the visceral cavity of a bird with the backbone of the bird protruding into the slot and the backbone is retained by the slot from lateral movement about the mandrel and the bird and mandrel are moved about cutting blades that pass adjacent the recess of the mandrel elements to cut away portions of the carcass and the slot of the mandrel is moved about a cutting blade to cut the carcass along the backbone.

* * * * *

Disclaimer 4,559,672.—*Jacobus E. Hazenbroek*, Numansdorp, Netherlands and *William L. Wallbridge*, Romsey, Hants, England. POULTRY CUT-UP MACHINE. Patent dated Dec. 24, 1985. Disclaimer filed Jan. 6, 1986, by the *inventors*.

The term of this patent subsequent to Dec. 17, 2002 has been disclaimed.
[*Official Gazette April 1, 1986.*]